Nov. 18, 1952  H. W. PETERS  2,618,218
BEVERAGE MAKER
Original Filed June 9, 1948
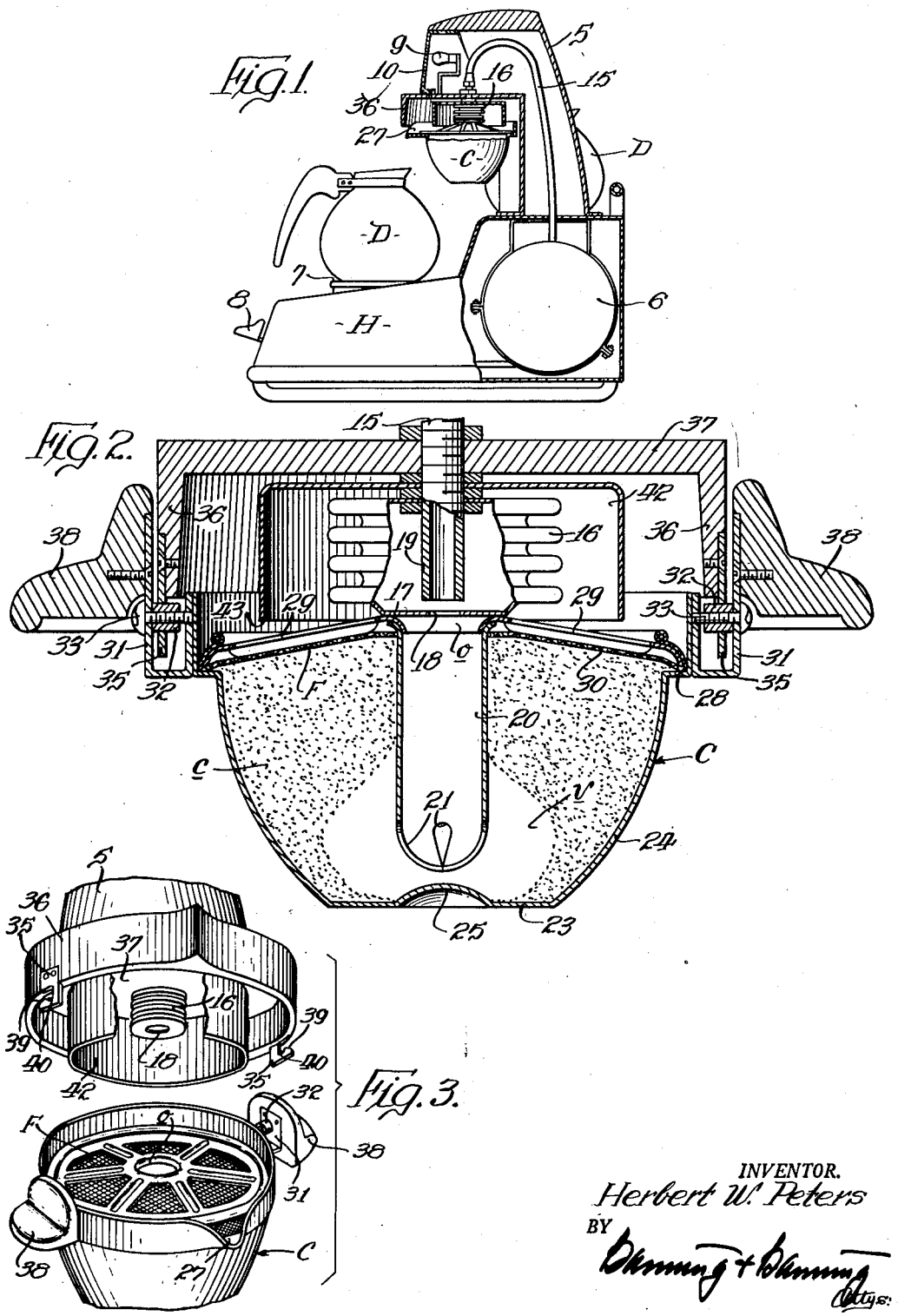
INVENTOR.
Herbert W. Peters
BY
Ohmung + Ohmung
Attys.

Patented Nov. 18, 1952

2,618,218

UNITED STATES PATENT OFFICE 2,618,218

BEVERAGE MAKER

Herbert W. Peters, Milwaukee, Wis., assignor to Cory Corporation, Chicago, Ill., a corporation of Delaware Original application June 9, 1948, Serial No. 32,003. Divided and this application January 17, 1951, Serial No. 206,406

6 Claims. (Cl. 99—303)

This invention relates to a hydraulic coupling applicable to beverage brewers such as are used in restaurants and other commercial establishments for preparing large or repeated quantities of beverage, such as coffee. In an exposition of the present invention it is expedient to describe briefly a commercial automatic brewer having an arrangement of hot water supply and coffee cartridge which facilitates the operation of preparing the beverage. In such an apparatus the hot water is taken from a tank or other source through a duct, and then downwardly into the cartridge at its top. In this downward movement the liquid penetrates the charge over a relatively small area, it then spreads out laterally into the charge, and then it works its way upwardly again from the lower portion of the charge to the top thereof for withdrawal at the point of delivery. In this way a very thorough impregnation of the coffee by the liquid is assured, and the cartridge need not be equipped with a check valve or like device to control the flow of liquid or to prevent dripping when the cartridge is removed for refilling.

It is a primary object of this invention to provide in a beverage brewer of the kind described, between the hot water supply conduit and the refillable cartridge, an improved hydraulic contact coupling which will avoid drippage when the cartridge is removed and which will not require the use of a drip-preventing valve. A prior disclosure of this invention has been made in my application filed June 9, 1948, Serial No. 32,003, which issued as Patent No. 2,561,134 on July 17, 1951, of which this case is a division.

In the following specification, taken in conjunction with the accompanying drawing, I have disclosed an apparatus for preparing coffee or other like beverage according to the method hereinafter set forth in detail. In the drawing:

Figure 1 is an end elevation, partly in vertical section, of an automatic beverage brewer of the type wherein the beverage is prepared by infusion at a point remote from the heat source;

Fig. 2 is an enlarged sectional view of the cartridge and associated parts; and

Fig. 3 is a perspective exploded view of the cartridge and, separated therefrom, of the mounting therefor.

The present automatic beverage brewer comprises a housing H from which rises a head 5. Within the housing are disposed various of the operating parts including a water heater 6 and a controlling mechanism which functions to shut off the water supply automatically. A platform 7 which forms a part of the controlling mechanism is adapted to support a decanter D in position to receive a filling of hot coffee. A control handle 8 projecting from the housing is manually operable to start the flow of hot water, and this flow is shut off automatically when the decanter D is filled to a predetermined level. A pilot light 9 situated behind a translucent panel 10 may be connected in circuit through a switch that is arranged to be closed while the brewing operation is in progress.

A conduit 15 extending upwardly from the water heater 6 is enclosed within the housing head 5 and near its discharge end this conduit is downwardly turned for attachment with the hydraulic coupling 16 of this invention. As shown, this coupling is a vertically-compressible Sylphon bellows having a bottom end 17 that is centrally apertured to provide a discharge opening 18. The delivery end portion 19 of the conduit 15 extends downwardly within the coupling close to its discharge aperture 18. When in use, the coupling is compressed axially (as will hereinafter be pointed out) to an extent such that the delivery end of the conduit 15 is at an elevation not higher than slightly above the bottom end 17 of the bellows; the annular passageway into the bellows through its discharge opening 18 is thereby maintained close enough to prevent air within the coupling from being displaced by water passing therethrough from the conduit 15.

A cartridge C is detachably mounted on the head 5 by means later to be described. A charge c of a beverage-producing ingredient, such as ground coffee, is placed in the cartridge where it is tightly packed and held in place by a filter unit F having a central opening o in communication with a depending delivery tube 20 whose rounded bottom end is provided with a plurality of vertical discharge ducts 21. This filter unit closes the top of the cartridge. The coupling 16 which is carried by the conduit 15 near its discharge end is fitted closely against the filter unit F centrally thereof so that a stream of hot water delivered to and passing through the coupling is conducted downwardly through the tube 20 for discharge laterally therefrom at a point well within the body of the charge c.

The cartridge C is formed at its top with a wide open mouth, its bottom end 23 being closed. The curved side 24 of the cartridge is preferably formed as a surface of revolution that converges from the mouth of the cartridge to its closed bottom end 23. When the brewer is in operation, hot water from the conduit 15 enters the cartridge laterally through the discharge slots 21 near the bottom end of the delivery tube 20 and penetrates the charge c downwardly over a relatively small cross sectional area for a substantial depth, then gradually spreads out and works its way upwardly through the charge. The reversal in flow of the water and the upwardly spreading action thereof may be facilitated by a protuberance 25 projecting upwardly from the cartridge bottom and by the upwardly divergent configuration of its side wall 24. The coffee grounds or other ingredient are forced up against the filter unit F by the pressure of the water. The completed infusion emerges from the charge c over a relatively large area and drains through a pouring spout 27 formed in the upper end of the cartridge from whence it is delivered to the decanter D. After passage of the water through the charge c it will be found that in the charge there is formed a substantially pear-shaped void or cavity, as indicated at v.

The cartridge C may be made of any suitable material, such as stainless steel. Near its top the cartridge wall 24 is outwardly offset to afford an annular ledge 28 on which the filter unit F is adapted to seat. The filter unit is of reinforced construction so as to be relatively rigid. As illustrated, it comprises a frame in the form of a spider 29 of frustro-conical shape having at its apex the centrally located opening o, the spider being adapted for positioning against the underface of the coupling 16 which depends from the delivery end of the hot water conduit 15. The spider 29 supports a strainer, here shown as a screen 30 of stainless steel wire gauze or the like. The outer periphery of the spider may be fitted into a gasket (not shown) that is adapted to seat on the ledge 28.

The lateral spreading of the hot water at the bottom of the charge c, and the reversal of the flow of the water from a downward to an upward direction produces a leaching of the coffee together with a liberation of carbon dioxide gas ($CO_2$) and formation of bubbles which rise and carry with them fine particles of the ground coffee. These bubbles and fine particles which collect at the lower face of the screen 30 form a filter bed through which the liquid is filtered whereby finer particles are prevented from passing through the screen, resulting in the production of a clear uniform infusion.

The cartridge C is preferably mounted on trunnions supported by the head 5. For this purpose two U-shaped brackets 31 may be secured at diametrically opposite points to the outer circular face of the cartridge at its upper end. The spout 27 of the cartridge is positioned midway between the brackets. Rollers 32 are rotatably mounted on screws 33 which extend through the legs of the brackets 31. Notched trunnion plates 35 are secured to the sides of a flange 36 depending from a shelf 37 on the head 5, the notches of these plates receiving a roller 32 when the cartridge C is suspended from the head. Grips 38 are attached to the brackets 31 outwardly thereof whereby the cartridge C may be grasped by both hands and manipulated into operative position, thereby causing the rollers 32 to ride up on cam faces 39 and seat in locking recesses 40 in the notched plates 35. The details of this part of the construction are fully disclosed in Letters Patent No. 2,514,596 dated July 11, 1950, and form no part of my present invention.

When the cartridge C is mounted in its position of use, as just described, the coupling 16 is subjected to vertical endwise pressure by the filter unit F so as to be in water-tight sealing engagement therewith. The coupling 16 is axially resilient and comprises a series of dished, elastic metal sections closed at the bottom end 17 which abuts the periphery of the opening o centrally of the filter unit F. An inverted cup 42 is anchored at its axial center to the delivery end portion 19 of the conduit 15. When so positioned, it serves as a stop to limit the upward movement of the filter unit F. This cup is so proportioned that its annular edge 43 may engage the spider 29 along a circular line of contact of a diameter so chosen that hydraulic pressure within the cartridge will act on the radial arms of the spider with a minimum of bending moment.

The bellows coupling is effective to prevent escape of the water laterally therefrom under all normal conditions of operation. The space within the Sylphon bellows is filled with air and consequently any water backing up through the tube 20 cannot fill the coupling to any considerable extent. When the cartridge C is removed for refilling little or no dripping from the coupling can take place so that no drip-preventing valve therefor is needed.

Particular attention is directed to the special design of the cartridge C which in conjunction with the other features of the apparatus assures that the coffee infusion or other beverage will be of the best quality obtainable from the beverage-producing ingredient used, and of uniform strength. The bellows type of coupling 16 materially expedites insertion and removal of the cartridge. The expansible action of the bellows stabilizes the cartridge as it is suspended from its trunnions. At the same time a certain amount of flexing movement of the coupling is permitted whereby, for example, accidental joggling of the cartridge, while the brewing operation is in process, does not destroy the water-tight seal between the coupling and the filter unit F. At the conclusion of the brewing operation the operator may tip the cartridge slightly forwardly to drain off any excess hot infusion before removing the cartridge, thereby further reducing any danger of scalding. All parts which contact the beverage are readily removable for cleaning. The shape of the cartridge renders it particularly convenient to keep clean.

I claim:

1. A coffee maker comprising a hydraulic coupling having a Sylphon bellows with a vertical axis of compression, an axial discharge opening in its lower end, and a vertical conduit extending axially into said bellows through the upper end thereof and open at its lower end, the bellows being adapted to be compressed axially, when in use, to such an extent that the conduit lower end is at an elevation not higher than slightly above the lower end of the bellows whereby the annular passageway thereinto through its discharge opening is insufficient to allow the air within the bellows to be displaced by water passing therethrough from the conduit, a removable cartridge providing a receptacle for beverage-making material, and a filter unit forming a removable closure for the top of the receptacle, said filter unit having an axial intake opening and being operative to engage the lower end of the Sylphon bellows with its intake opening registering with the discharge opening thereof, and further operative, when the cartridge is in its normal position, to hold the bellows under axial compression, and stop means for limiting upward movement of said filter unit, said stop means being adapted to engage said filter unit along a circle concentric with its vertical axis and of a diameter such that the bending stress produced in the filter unit by hydraulic pressure acting upwardly thereupon and against said stop means is approximately a minimum.

2. A coffee maker comprising a hydraulic coupling having a Sylphon bellows with a vertical axis of compression, an axial discharge opening in its lower end, and a vertical conduit extending axially into said bellows through the upper end thereof and open at its lower end, the bellows being adapted to be compressed axially, when in use, to such an extent that the conduit lower end is at an elevation not higher than slightly above the lower end of the bellows whereby the annular passageway thereinto through its discharge opening is insufficient to allow the air within the bellows to be displaced by water passing therethrough from the conduit, a removable cartridge providing a receptacle for beverage-making material, and a filter unit forming a removable closure for the top of the receptacle, said filter unit having an axial intake opening and being operative to engage the lower end of the Sylphon bellows with its intake opening registering with the discharge opening thereof, and further operative, when the cartridge is in its normal position, to hold the bellows under axial compression, and stop means for limiting upward movement of said filter unit, comprising an inverted cup fixedly mounted with respect to the conduit within the bellows and having its bottom annular edge arranged to engage said filter unit along a circuit concentric with its vertical axis and of a diameter such that the bending stress produced in the filter unit by hydraulic pressure acting upwardly thereupon and against said stop means is approximately a minimum.

3. A beverage maker comprising a hydraulic coupling having a Sylphon bellows with a vertical axis of compression and an axial discharge opening in its lower end, and a vertical hot water conduit extending axially into said bellows through the upper end thereof, said conduit being of such length that when the bellows has been compressed axially, the lower open end of the conduit will be in juxtaposition to said axial discharge opening, the annular passageway below the lower end of the conduit into the bellows being insufficient to allow the air within the bellows to be displaced by the hot water passing from said conduit, a removable cartridge providing a receptacle for beverage-making material, and a filter unit removably providing a closure for the top of the receptacle, said filter unit having an axial intake opening in communication with the discharge opening of said bellows and being operative to engage the lower end of the Sylphon bellows, and being further operative, when the cartridge is in its normal position, to hold said bellows under axial compression, and means for limiting the bending stress produced in the filter unit by hydraulic pressure acting upwardly thereupon to substantially a minimum.

4. A beverage maker comprising a hydraulic coupling having a Sylphon bellows with an axial discharge opening in its lower end, an inlet conduit extending into the upper end of the bellows, said conduit being of such length that when the bellows has been axially compressed, the open end of the conduit within the bellows is in juxtaposition to said axial discharge opening, the annular passageway below the lower end of said conduit into said bellows being insufficient to allow the air within the bellows to be displaced by the liquid passing from said conduit, first means providing a beverage-making material receptacle disposed below said bellows, and filter means mounted on said first means and engageable with the lower end of said bellows, liquid from said conduit passing into said first means for contact with beverage-making material therein and passing from said first means through said filter means, the liquid pressure acting against the filter means effecting compression of the Sylphon bellows whereby when the liquid supply is cut off, the air within the bellows prevents the return flow of liquid from the first means.

5. A beverage maker comprising a coupling including a Sylphon bellows with an axial discharge opening in the lower end thereof, a liquid inlet conduit extending through the upper end of said bellows and in axial alignment with said discharge opening and having its outlet end in juxtaposition to said discharge opening, first means providing a beverage-making material receptacle disposed below said bellows, and filter means mounted on said first means and engageable with the lower end of said bellows, liquid from said conduit passing into said first means for contact with beverage-making material therein and passing from said first means through said filter means, the liquid pressure acting against said filter means effecting compression of said bellows whereby when the liquid supply is cut off, the air within the bellows prevents the return flow of liquid from the first means.

6. A beverage maker comprising a coupling including a Sylphon bellows with an axial discharge opening in the lower end thereof, a liquid inlet conduit extending through the upper end of said bellows and in axial alignment with said discharge opening and having its outlet end in juxtaposition to said discharge opening, first means providing a beverage-making material receptacle disposed below said bellows, and a filter unit mounted on said first means, said filter unit including a centrally apertured filter element positioned over said first means to filter the liquid passing therefrom, the aperture in said filter element being aligned with said inlet conduit to admit liquid into the receptacle, a frame carried by said first means and supporting said filter element in position, said frame being of spider form and having an annular shoulder for sealing engagement with the lower end of said bellows and a central opening in alignment with the aperture of the filter element, said frame having a plurality of radially disposed flexible arms extending from said annular shoulder, said flexible arms being flexed outwardly with respect to said first means in response to the liquid pressure acting against the filter unit.

HERBERT W. PETERS.

REFERENCES CITED

The following references are of record in the file of this patent:

UNITED STATES PATENTS

| Number | Name | Date |
|---|---|---|
| 1,474,270 | Lewis | Nov. 13, 1923 |
| 2,014,355 | Hussman | Sept. 10, 1935 |
| 2,337,038 | Fentress | Dec. 21, 1943 |
| 2,484,054 | Sharp | Oct. 11, 1949 |